United States Patent
Boyer, Jr.

(10) Patent No.: US 6,213,352 B1
(45) Date of Patent: Apr. 10, 2001

(54) FOLDABLE DRUM DRAINING DEVICE

(76) Inventor: Homer W. Boyer, Jr., 22 Browning Rd., Merchantville, NJ (US) 08109

( * ) Notice: Subject to any disclaimer, the term of this patent is extended or adjusted under 35 U.S.C. 154(b) by 0 days.

(21) Appl. No.: 09/132,319

(22) Filed: Aug. 11, 1998

(51) Int. Cl.[7] .................................. B67D 5/00
(52) U.S. Cl. .................. 222/166; 141/319; 141/364; 141/375; 141/391; 414/419; 414/758; 414/770; 414/783
(58) Field of Search .................. 141/319, 320, 141/364, 369, 370, 375, 390, 391; 222/164, 166, 167, 173; 414/419–421, 758, 770, 783

(56) References Cited

U.S. PATENT DOCUMENTS

| | | |
|---|---|---|
| 496,537 | 5/1893 | Perrington . |
| 1,186,148 | 6/1916 | Tenney . |
| 1,561,025 | 11/1925 | Reimer . |
| 1,788,262 | 1/1931 | Wiebusch . |
| 1,994,158 | 3/1935 | Wiswell ............................. 141/330 |
| 2,084,711 | 6/1937 | Smith .................................. 226/58 |
| 2,807,290 | 9/1957 | Hearn ................................ 141/375 |
| 2,844,264 * | 7/1958 | Stirm et al. ....................... 414/421 |
| 3,334,884 * | 8/1967 | Suzuki et al. .................... 222/166 |
| 3,350,083 * | 10/1967 | Buhrer et al. .................... 222/166 |
| 3,814,150 | 6/1974 | Gower .............................. 141/337 |
| 4,687,405 * | 8/1987 | Olney ............................... 414/421 |
| 4,940,335 * | 7/1990 | Gibson ............................. 222/166 |
| 4,995,781 * | 2/1991 | Herzog ............................. 222/166 |
| 5,275,662 * | 1/1994 | Werndler et al. ................. 222/166 |

* cited by examiner

Primary Examiner—J. Casimer Jacyna
(74) Attorney, Agent, or Firm—Paul & Paul

(57) ABSTRACT

A compact, foldable, storable, portable drum draining apparatus for facilitating the drainage of contents from a second drum or vessel into a first drum or vessel, including a first supporting member for supporting the first vessel and a second supporting member for supporting the second vessel, and a lifting mechanism for lifting the second vessel over and in tilted relation to the first vessel, and maintaining the second vessel in the raised, tilted position to permit the emptying of contents into the first vessel, the lifting mechanism including a hydraulic lifting device.

32 Claims, 8 Drawing Sheets

FOLDABLE DRUM DRAINING DEVICE

BACKGROUND OF THE INVENTION

1. Field of the Invention

This invention relates to the field of draining liquids from a vessel, and more particularly to a device and method for draining liquids and other viscous materials from one vessel into another vessel.

2. Brief Description of the Prior Art

In many instances it is desirable to remove contents from a vessel for a number of reasons. For example, the contents may be valuable or expensive, or scarce, and leaving behind some of the material can result in financial loss. In other cases, reuse of the containing vessel is required and to do so one must drain the vessel fully of all of its contents. There are yet further situations where the vessel contains a material which must be removed pursuant to federal, state and/or local laws. Often a residue will remain in a vessel of which the contents have been emptied. For example, where contents, such as a liquid, are poured from a vessel, a residual amount of the liquid often remains and is left behind in the vessel. This is especially the case for viscous liquids like molasses and sugar syrups, tar products for roofing and driveway coatings, paints and sealers, synthetic resins, and various other materials. Often, there is not time for the material to fully drain from the containment vessel and a residual amount of the material is left behind. This is observed in production facilities where large batches of a product are being made from material contained in one or more vessels. The need to have the material removed from the vessel for immediate use does not permit the full evacuation of the vessel contents.

In the ever-developing movement for conservation of resources, there is greater emphasis placed on the need to conserve materials, as well as to conserve landfill space that discarded or unwanted materials may occupy. A need exists to provide an improved method and device which will facilitate the evacuation of liquid materials from a vessel.

In many instances containment vessels are often large and cumbersome and can be extremely heavy. Generally, vessels containing liquids which are used in large scale industrial applications, for delivery of components in manufacturing operations, cannot even be lifted by a single individual, but rather, require special handling equipment to move and empty them. The special handling equipment is for the most part expensive and space consuming. This requires that heavy vessels which are to be lifted by the special handling equipment be readily removed from the equipment after the contents is poured out from the vessel. For example, industrial liquids are often supplied in large drum type vessels. These drum type vessels often contain a substantial amount of residual liquid, especially when the liquid contained therein is viscous, after the vessel has been tilted to pour its contents into a vat for use. While the drum vessel is indeed lighter, after having dumped most of its contents, it is still a substantially heavy item. While attempts have been made to drain the residue from the vessel, the weight and cumbersomeness of the vessel make for a difficult task.

In the use of drum type vessels, it is a common practice to recycle these vessels for reuse. The recycling process may include not only cleaning the vessel contents, but also, cutting an end of the vessel to remove embedded contents, or a damaged area, such as, for example, a broken sealing weld or connection. In many cases the vessels are provided to hold a standard amount of content, such as, for example, fifty-five gallons. Drum type vessels can be cut anywhere from fractions of inches to over one inch or more, and still be able to hold a desired amount, for example, fifty-five gallons, of material therein. The vessel height generally changes when the vessel is cut down, however, the diameter continues to remain the same.

One attempt known is to stack a vessel over another vessel at an angle. This often does not work well with heavy vessels, and further presents a dangerous condition in the work environment. The special handling pulleys or equipment can be used, but this is not practical since that equipment is expensive and must be available for pouring the contents from other vessels for use. Since the vessels have a considerable weight, the pulleys or vessel pouring equipment is often heavier and takes up a large amount of space, making it difficult to use such equipment for draining the remaining residue from a vessel. There exists a need for a device which is portable, light-weight, storable, uses minimal floor space and can readily be usable at a variety of locations, which will facilitate the draining of the residual contents from a vessel.

Prior attempts to provide draining devices include U.S. Pat. No. 496,537 "Drainage Skid" issued May 2, 1893 to E. I. Perrington. The drainage skid provides a rigid device which permits a first vessel to be held over a second vessel at an incline to drain the contents of the first vessel into the second vessel. Other prior art drainage apparatus include U.S. Pat. No. 2,807,290 "Oil Can Draining Rack" issued on Sept. 24, 1957 to R. T. Hearn. The oil can draining rack includes a rigid cage for maintaining a standing can at a fixed position while supporting a second can at an inclined position relative to the standing can. A "Can Draining Rack" is disclosed in U.S. Pat. No. 1,788,262, issued on Jan. 6, 1931 to C. J. Wiebusch. The can draining rack includes a pair of arms which are connected by a yoke to support an inverted inclined can. A chain attached to the arms is provided to engage the top of the standing can.

The prior attempts to provide a draining apparatus require that the user lift the vessel and install it on the apparatus. A need exists for a portable draining device which can facilitate lifting and maintaining a drum into a position for draining.

SUMMARY OF THE INVENTION

The present invention provides a novel foldable drum draining device which retains an emptying vessel into position, preferably at an incline, with respect to another vessel which is to receive the contents from the emptying vessel. The present device facilitates draining of the contents by maintaining a vessel at an incline for gravitational expulsion of the contents thereof. Furthermore, the present drum draining device includes lifting means for facilitating the lifting the of the emptying vessel into position for draining.

The drum draining device includes a first supporting member attached to a second supporting member. The first supporting member holds a first vessel and the second supporting member holds a second vessel. The first supporting member is connected to and supported by a base. The second supporting member is pivotally connected to the first supporting member and has a lifting portion on which the second vessel is placed. A hydraulic mechanism is provided to facilitate the lifting of the second vessel. Additional attachment members, which can include straps and the like, can be used to secure the vessels to the supporting members. Preferably, the apparatus is useful for emptying industrial drum type vessels. The lifting member is foldably provided so that it can be collapsed when the assembly is not in use. The first and second supporting members are also foldably provided relative to each other so that these members, along with the lifting member, can collapse to fold for ready transport and storage of the device. A locking mechanism is provided to lock the lifting member in an operable position when the assembly is in use and permit the folding of the lifting member when the assembly is not in use. Similarly, a locking member can be provided to lock the second supporting member relative to the first supporting member at a position which maintains the second vessel in an inclined or tilted position relative to the first supporting member and first vessel into which the contents from the second vessel are to drain.

It is an object of the present invention to provide a novel draining apparatus for draining the contents of a first vessel, such as a drum or the like, into a second vessel.

Another object of the present invention is to accomplish the above object wherein the apparatus can be folded for ready transport and storage.

It is a further object of the present invention to provide a draining assembly with a mechanism to facilitate lifting of a heavy vessel.

A further object of the present invention is to provide an adjustable mechanism which permits the apparatus to accommodate vessels having different heights.

It is a further object of the present invention to provide a drum draining apparatus, where the operator is required only to lift an amount of weight equal to the weight of the contents to be drained from a drum.

A further object of the present invention is to provide a self-regulating feature, which prevents overfilled vessels from being drained.

BRIEF DESCRIPTION OF THE DRAWING FIGURES

DETAILED DESCRIPTION OF THE PREFERRED EMBODIMENTS

Figure 1:
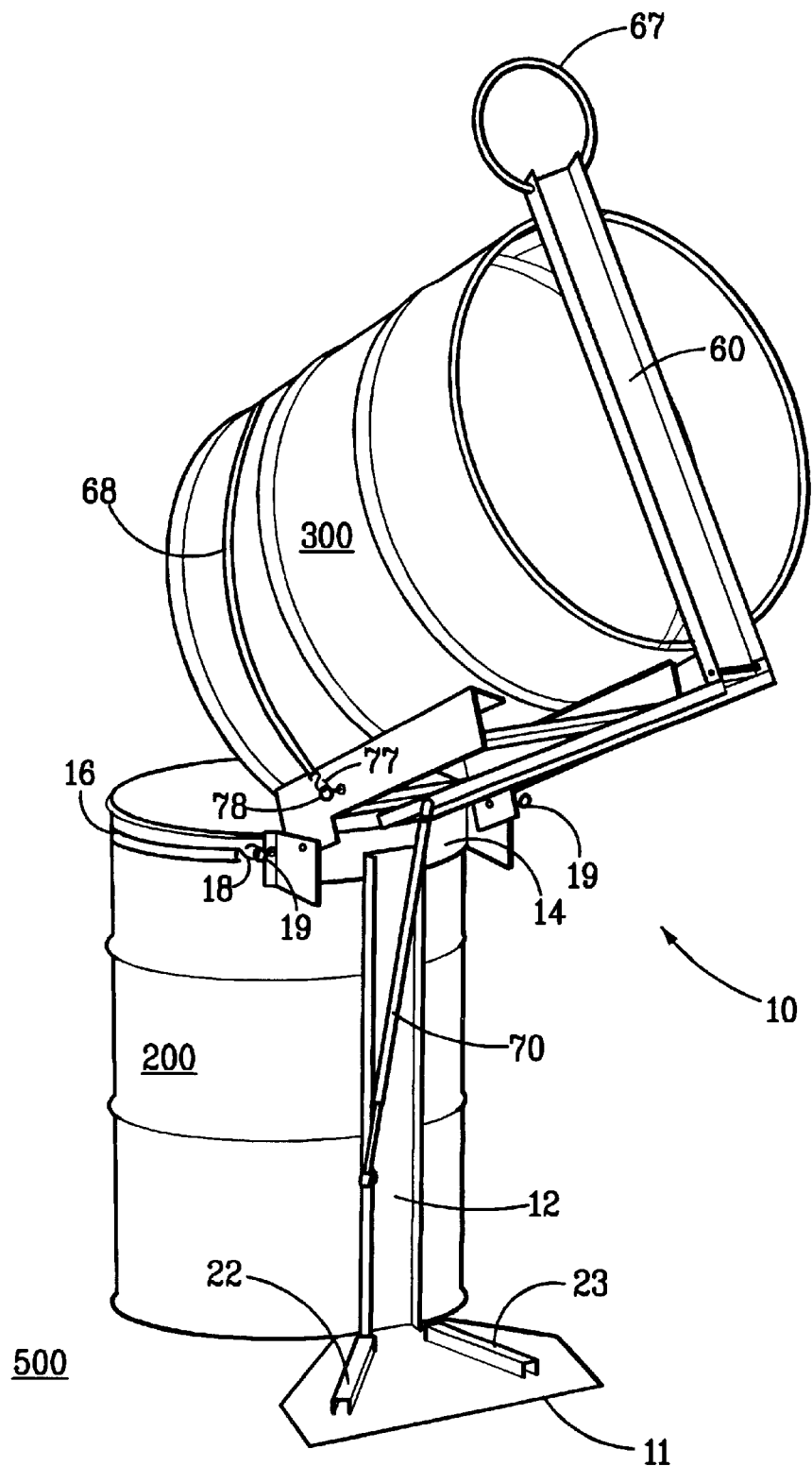
FIG. 1 is a parallel perspective view of a drum draining device according to the present invention, shown in the draining position, in use with a first vessel and a second vessel, as viewed from the left side.

Referring to FIG. 1, a preferred embodiment of a drum draining assembly 10 according to the present invention is shown. The drum draining assembly 10 is shown in use with a first vessel, such as for example, the first barrel 200 and the second barrel 300. The drum draining assembly 10 includes a base 11, first support means for supporting the first vessel 200 and second support means for supporting the second vessel 300. The first support means is shown comprising a first supporting member 12 which is connected to the base 11.

Figure 2:
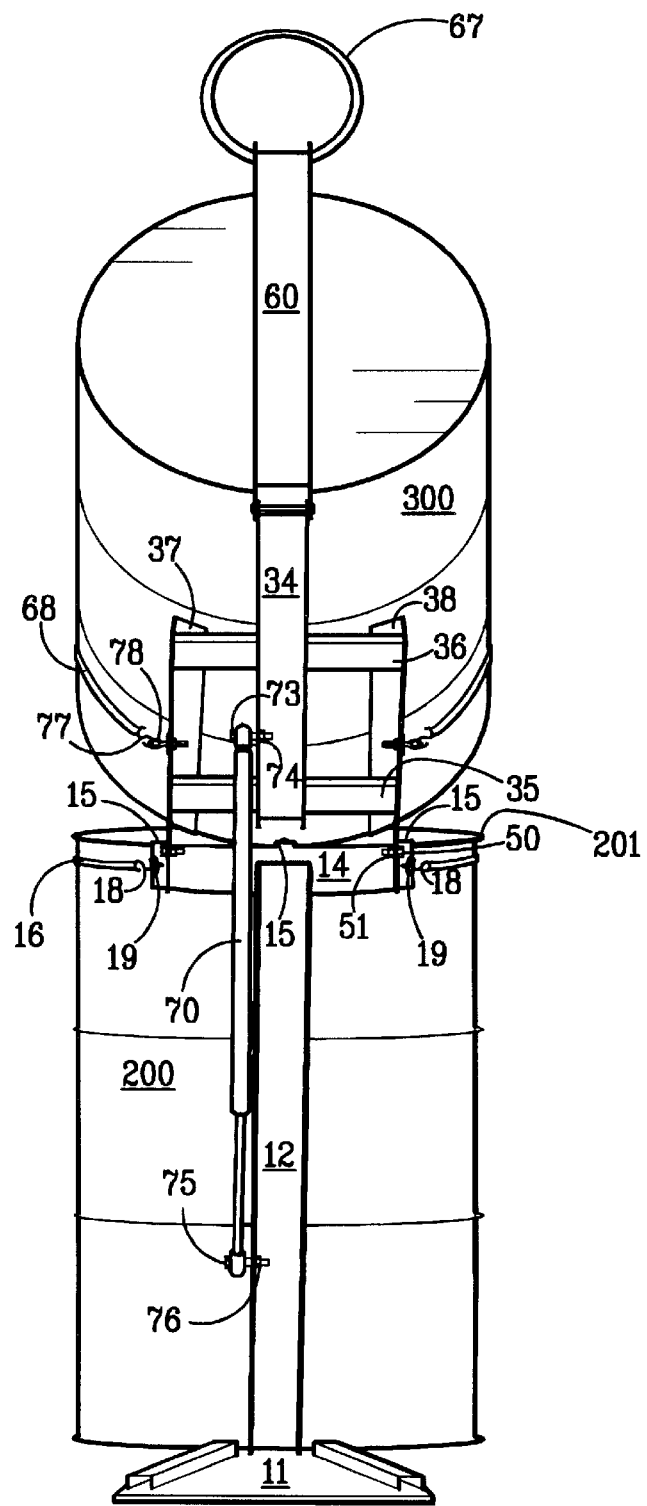
FIG. 2 is an enlarged rear parallel perspective view of the device of FIG. 1.

Securing means is provided for securing the first barrel 200 to the first supporting member 12. Referring to FIG. 2, first securing means is shown comprising an arcuate collar portion 14 connected to the first supporting member 12. The collar portion 14 has a plurality of retaining elements, such as, for example, the flange members 15. The flange members 15 are generally u-shaped in configuration to engage the lip 201 of the first barrel 200. The securing means preferably further comprises a retaining member disposed about the circumferential periphery of the vessel 200. The retaining member can comprise a strap member 16 which is secured with fastening means at each end of the collar portion 14. The fastening means can comprise hooks, chains, bolts, or any other suitable like member. As shown in FIG. 2, generally s-shaped hooks 18, secured to respective hook retaining members 19, are provided on each side of the collar 14. The strap member 16 is fastened to the collar portion 14 with the hooks 18. Preferably, the retaining member is adjustably provided to accommodate barrels having different diameters. For example, the strap 16 can comprise a resilient member which can be stretched around the circumference of the vessel 200 to retain it.

Figure 3:
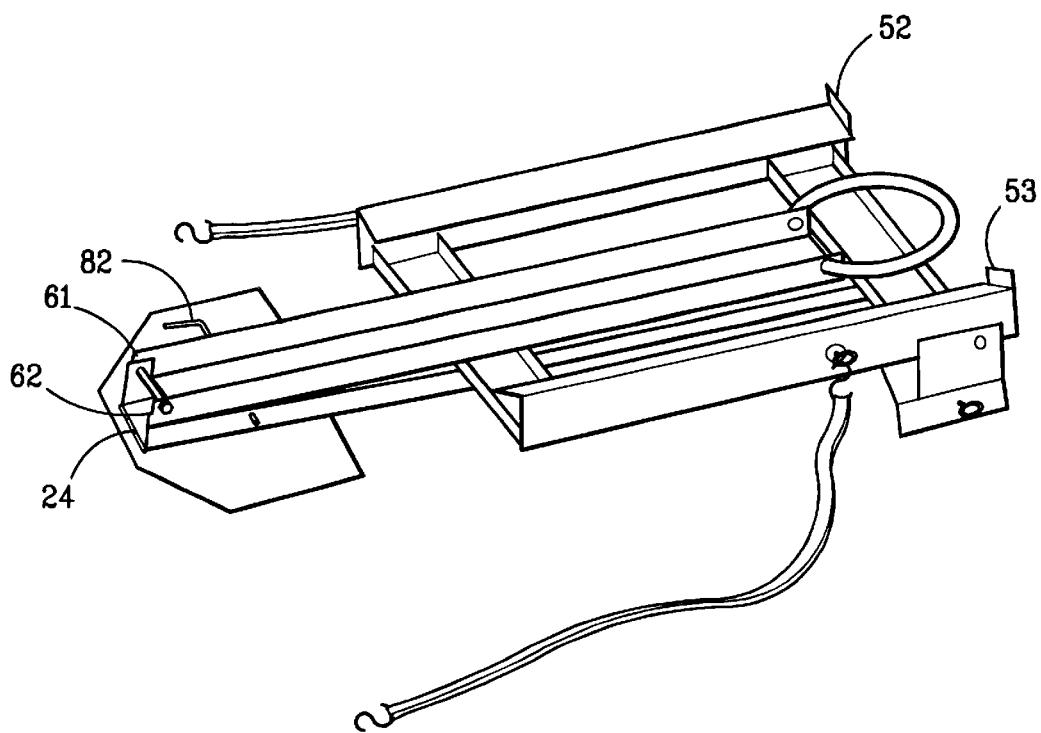
FIG. 3 is a parallel perspective view of the drum draining device according to the present invention shown in its folded position.

The base 11 preferably comprises a member which rests on a surface, such as, for example, the floor 500 on which the first drum 200 is sitting. The base 11 is shown with reinforcing means comprising the strengthening members 22,23. To permit the assembly 10 to fold, the base 11 is preferably pivotally connected to the first supporting member 12 of the first support means. A hinge 24 is shown in FIG. 3 connecting the first supporting member 12 to the base 11. Preferably, the hinge 24 permits backfolding of the base relative to the first supporting member 12. The hinge 24 is preferably provided so that when the base 11 is unfolded, from its FIG. 3 position to its FIG. 2 position, the hinge 24 stops the base 11 from further movement once the base 11 has been unfolded to be perpendicular to the first supporting member 12.

A locking means is provided to lock the base 11 and first supporting member 12 against relative rotation when the device 10 is in use, or when the device 10 is folded for transport or storage. The locking means can comprise a first aperture 28 disposed in the base member 11 and a second aperture disposed in the first supporting member 12. The apertures 28, 29 are positioned to align with one another when the first supporting member 12 is substantially perpendicular to the base 11. A retaining pin 31 can be installed in the apertures 28,29 to prevent relative movement of the base 11 and first supporting member 12.

The second support means is shown comprising a second supporting member 34, and which is connected to a pair of transverse members 35,36. The transverse members 35,36 support carriage members 37,38 which are disposed parallel to the second supporting member 34. The carriage members 37,38 each include a sidewall portion 40,41 respectively, with an inturned flange 42,43, respectively, provided to support the second vessel 300.

Connecting means are provided for pivotally connecting the second supporting member 34 to the first support means.

Figure 4:
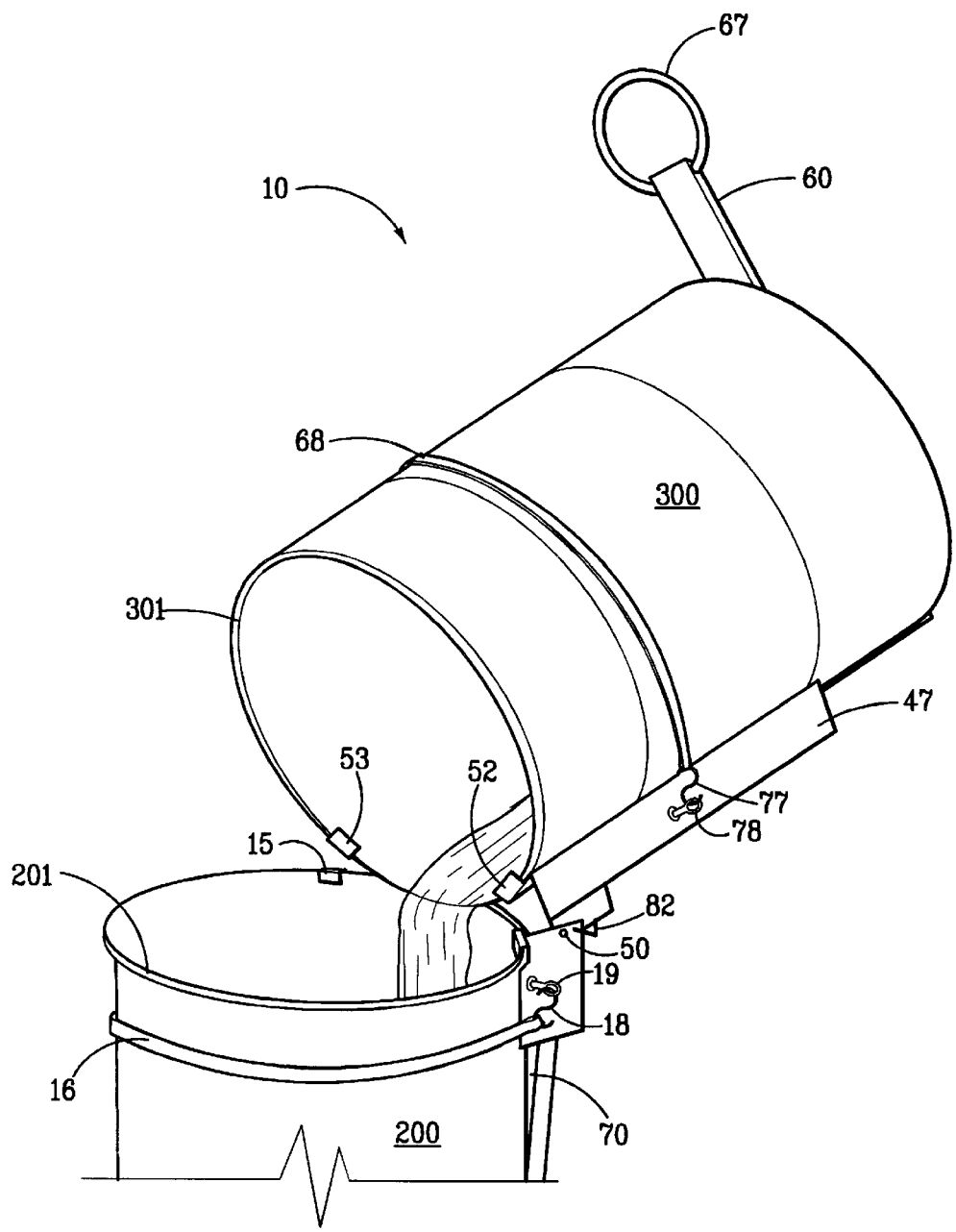
FIG. 4 is a parallel perspective view of the drum draining device according to the present invention, shown in use, with liquid draining from a second vessel into a first vessel.

The connecting means is shown comprising a pair of flange members 45,46 extending outwardly from the collar portion 14. The second supporting member 34 further comprises connecting wall portions 47,48 which are secured to the collar flange members 45,46, respectively, by a fastening member. The fastening member can comprise bolts, pins, bushings, or other suitable members which secure the collar flanges 45,46 and connecting wall portions 47,48 together in a pivotal relationship. A bolt 50 and retaining nut 51 is shown in FIGS. 1 and 2 connecting each flange member 45, 46 with a respective wall portion 47, 48. Washer means can also be used to facilitate the pivot relationship between the first support means and the second support means. Washer means, for example, while not shown, can comprise washers provided between the first supporting member flanges 45, 46 and the respective connecting wall portions 47, 48 of the second support means. A second vessel stop means is provided to maintain the second vessel 300 against forward movement by providing engaging ledge elements 52,53 against which the lip 301 of the second vessel 300 engages, as shown in FIGS. 3 and 4.

Securing means are provided to secure a second vessel 300 to the second support means. As described above in connection with the securing of the first vessel 200 to the first support means, a strap 68 can be used. Preferably, fastening members, such as for example hooks 77 and retaining members 78 can be provided for fastening the strap 68 on each side of the carriage members 37,38, as shown in FIG. 2.

Lifting means is provided to facilitate lifting of a second vessel 300. The lifting means is shown comprising a lift support member 60 which is connected to the second supporting member 34. Preferably, the lift support member 60 is provided to be positioned at about 90 degrees with respect to the second supporting member 34 when the device 10 is to be operated, as shown in FIG. 2. A stop is provided on the second supporting member 34 of the second support means to maintain the lift member 60 in its perpendicular position for lifting of a second vessel 300. The stop is shown comprising end portions 61,62 which engage the second supporting member 34 when the lift member 60 is unfolded with respect to the second support means to its substantially perpendicular position (FIG. 1). The lift member 60 further includes a handle 67 which is provided on the end of the lift member 60 opposite that end which is connected to the second support means.

Preferably the lifting means further comprises hydraulic means for lifting the second vessel 300 over, and in tilted relation to, the first vessel 200. The hydraulic means is shown in FIGS. 1 and 2 comprising a gas spring 70 which is secured at one end thereof to the first supporting member 12 and at the other end thereof to the second supporting member 34. As shown, the gas spring 70 can include mounting means at each end thereof, shown comprising the mounting apertures 71,72. A bolt and nut arrangement can be used for securing the gas spring 70 to the apparatus 10, such as the bolt 73 and nut 74 which holds the top end of the gas spring 70 second supporting member 34, and the bolt 75 and nut 76 which holds the lower end of the gas spring 70 on the first support member 12. Preferably, a bushing or washers, not shown, are used to pivotally mount the ends of the gas spring 70 to permit the spring 70 to rotate as the second support means is raised with a second vessel 300 thereon. The gas spring 70 provides a lifting force which parallels that of an operator using the handle 67 to complement the force required for lifting of the second vessel 300.

When the gas spring is actuated by the lifting of the handle 67, the force is provided to lift the second drum 300 in a substantially inclined position over the first vessel 200 to permit the contents of the second vessel 300 to drain therefrom. The second vessel 300 generally remains in the inclined position until the operator lowers it by grasping the lift handle 67 and applying a downward force, counter to the gas spring force. The application of the downward force causes the gas spring 70 to relax and lower the second vessel 300 to its original upright position.

A retaining member, such as, for example, the release pin 82 shown in FIG. 3, is provided to secure the first supporting member 12 and second supporting member 34 relative to each other. Bores 80 and 81 are respectively provided transversely in the first supporting member 12 and in the second support member 34. The bores 80 and 81 extend through each support member 12,34 and are aligned with each other when the first supporting member 12 and second supporting member 34 are folded When the release pin 82 is removed, the second supporting member 34 can be lifted away from the first supporting member 12. A first retaining aperture 83 is provided on a flange portion 45,46 of the collar member 14. A matingly provided second aperture 84 is provided on an adjacent connecting wall portion 47,48 of the second support means, such that when the second vessel 300 is lifted to its inverted inclined position, as shown in FIG. 2, the first and second apertures 83, 84 mate with one another for receipt of the retaining pin 82 therein. While the retaining member is shown comprising a pin and a pair of apertures, it will be understood that the retaining member can comprise any suitable member which can permit selective retention of the first support means and the second support means. One such example of a retaining member is a latch, such as a slam action latch which can be actuated to latch the first support member 12 and second support member 34 together when folded. The slam latch can further include a release lever or actuator which the operator can actuate to release the first and second support members from engagement with each other. In addition, while shown in FIG. 4, the pin 82 can be replaced with another retaining member, such as, for example, the slam latch member, described herein. In this manner, the second support means, when lifted into its tilted position, can be held there by the actuation of a slam latching mechanism. As described, a release lever or actuator on the latch can be used to disengage the second support means from its lifted, inclined position, to permit the return to the floor of the second vessel.

Figure 5:
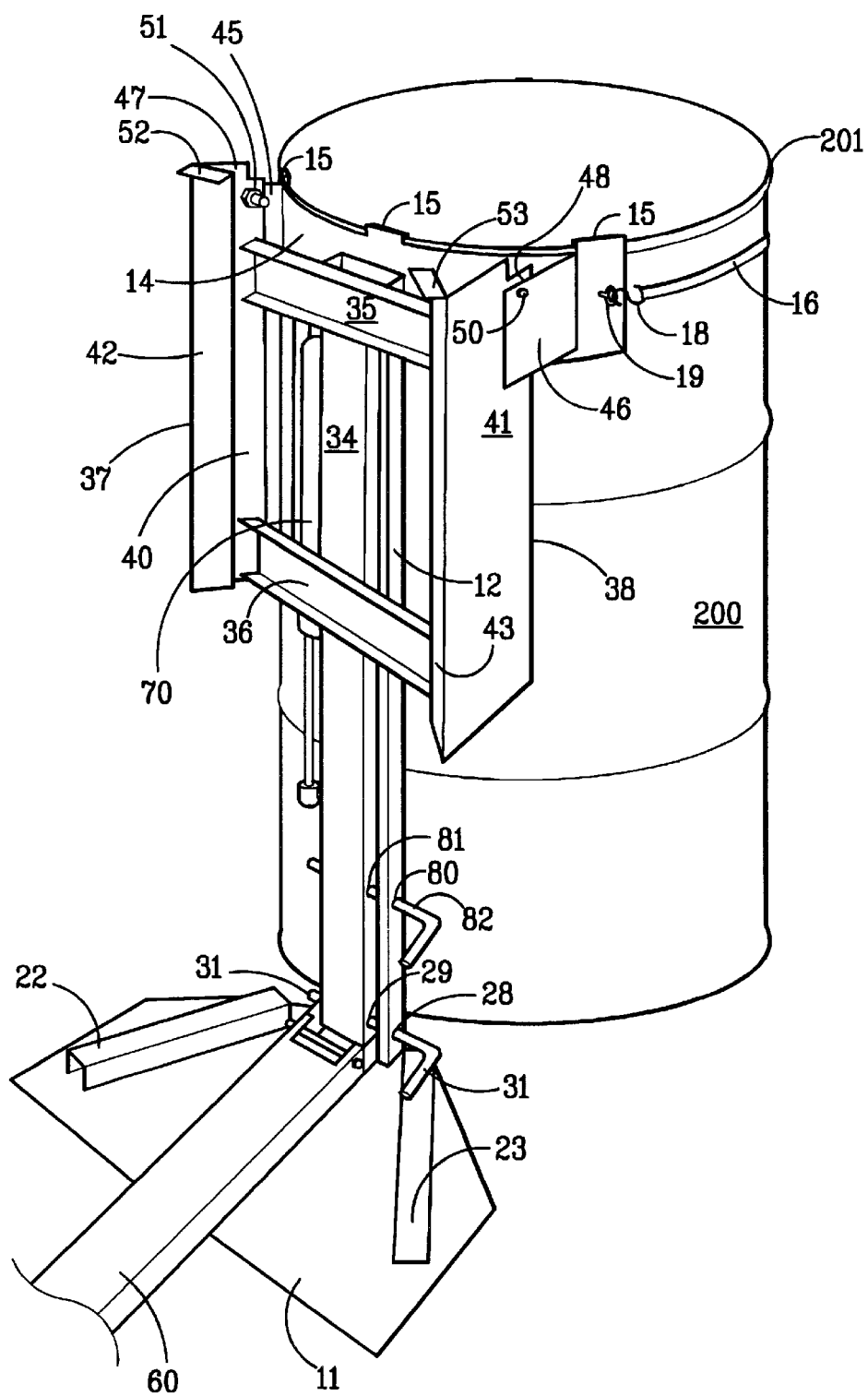
FIG. 5 is a parallel perspective view of the drum draining device according to the present invention, shown installed on a first vessel and positioned to receive a second vessel thereon.

The device 10 can be operated as follows. The drum draining device 10 is placed on the floor, as shown in FIG. 4, and starting from its stored or folded position, is used as follows. A first vessel or drum 200, into which the contents of a second vessel or drum 300 are to be drained, is attached to the drum draining device 10, as shown in FIG. 5. Preferably this is done by placing the retaining flanges 15 over the lip 201 of the first vessel. The drum draining device 10 is secured to the first vessel 200 by placing the flange members 15 over the lip 201 of the vessel 200. The base 11 of the draining device 10 is unfolded and placed on the floor 500 relative to the first supporting means which is positioned upright. The additional securing means are fastened by placing the strap 16 around the circumference of the vessel 200 and securing the strap 16 to the retaining member 19 with a fastener or hook 18. The second vessel 300 is placed on the second supporting means 34 of the device 10. The second vessel 300 is positioned on the lifting member 60 and is secured to the second supporting means 34 with a strap 68, similar to that 16 described in connection with securing of the first supporting means 12 to the first vessel 200.

With the first and second vessels placed on the device 10, the operator disengages the release member, shown comprising a release pin 82, and then grasps the handle 67 attached to the lift member 60. The operator then lifts the handle 67 to raise the second vessel 300 relative to the first vessel 200. As the operator continues to lift the handle 67, the gas spring 70 is actuated to release its arm 80 thereby assisting the operator to lift the second vessel 300 and the contents contained therein. Preferably, the gas spring 70 is provided to supply the amount of force required to lift a second vessel, such as that 300 shown and described herein, into its draining position, inclined and above the first vessel 200. With the gas spring 70 supplying the lifting force for the second vessel 300, the operator need only lift the weight associated with the contents or residue remaining in the second vessel 300. The second vessel 300 is lifted until it engages the ledge stop elements 51,52 of the second supporting means.

The lip 301 of the second vessel is restrained from further downward movement by the stop elements 51, 52. While not shown, the stop elements can also be provided to comprise a unshaped configuration which extends into the second vessel 300. In the arrangement where the stop flange extend into the second vessel 300, it will be preferable to locate the stop flange members outside of the drip or flow zone of the material.

While not shown, a pivot stop means can be provided to limit upward movement of the second support means relative to the first support means. The pivot stop means, for example, can comprise a first element on one or the other of the second support means and the first support means for engaging a second element on the other of the second support means and the first support means. The engaging elements, for example can comprise a retaining flange portion (not shown) extending from the second supporting member 34 and a limiting flange provided on the collar portion 14 of the first support.

With the second vessel 300 in its raised inverted position, the operator then actuates the locking mechanism to lock the second supporting means 34 into the inverted position relative to the first supporting means 12. The locking mechanism shown includes a pin 82 which is inserted transversely through the first supporting means 12 to prevent downward movement of the second supporting means 34.

The second vessel 300 is then permitted to remain in its draining position, the FIG. 2 position, until the contents thereof is sufficiently drained or considered to be empty. For example, where slow moving viscous material is contained in the second vessel 300, the second vessel 300 will remain tilted for a period of time within which the material can drain into the first vessel 200.

When the second vessel 300 is finished draining, the operator releases the locking mechanism, for example, by removing the pin 82, and pushes the second vessel 300 down to its starting position where it is generally upright alongside the first vessel. The operator then actuates the locking means to secure the first supporting means and second supporting means together to prevent relative movement therebetween and prevent inadvertent lifting of the second supporting member 34. This is done by inserting the retaining pin 82 to hold the second support means down alongside the first supporting member 12. The strap 68 is removed from the second vessel 300 and the second vessel 300 is removed from the device 10.

The first vessel 200 can also be removed from the device 10, or alternately, can remain attached to the device 10 to receive the contents from another vessel (a next second vessel).

When the draining is completed, the drum draining device can be folded for storage or transport. The base 11 folds relative to the first supporting means, and the second supporting means folds to be aligned with the first supporting means. The lifting member likewise folds to align with the first and second supporting members. A strap or belt (not shown) can be supplied to retain the assembly in its folded condition. Similarly, retaining members, such as, for example, pins, latches, or the like, can also be employed to lock the components together when the device 10 is folded to prevent unfolding. Preferably, one of more of the components of the device 10 can be provided to comprise a handle for facilitating transport of the folded device 10. For example, the angled cradle members, when folded, can provide a gripping portion for an operator's hand.

Figure 6:
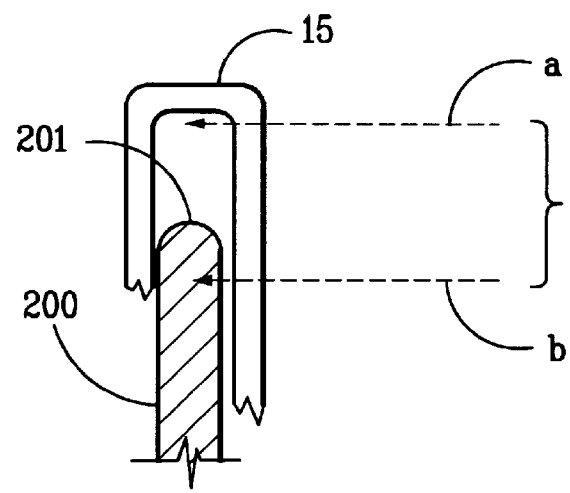
FIG. 6 is a partial view of a section of a first vessel received in a flange member.

FIG. 6 shows the retaining means of the present invention in an enlarged close up view with a vessel end shown in sectional view. The retaining range is shown by the distance between arrows "a" and "b" within which the vessel rim 201 can be received and retained with the device 10. The retaining means therefore permit the device 10 to accommodate standard size vessels, for a give application, and the minimum acceptable sized vessels (which is shorter), including recycled or reconditioned vessels which can hold a standard content amount. For example, if a fifty-five gallon drum can be used to hold fifty-five gallons of material at its standard height, and up to a height of two inches lower than its standard height, preferably, the retaining means, such as the flange members can be provided with a retaining range ("a" to "b") which can receive vessels which have varying heights.

Although the retaining means of the present device provides for accommodation of vessels having various heights, in an alternate embodiment of the present invention, the central bar of the first and second supporting members can be adjustably provided for accommodating vessels having different heights. Similarly, the second support member can be adjustably provided to likewise accommodate second vessels having different heights.

Furthermore, while not shown additional means such as roller transport and the like can be used to facilitate placement of the second vessel on the lifting member of the apparatus. For example, the lift member may be provided with additional holding means, including arms which can swing out therefrom, to provide additional support for a second vessel.

Figure 7:
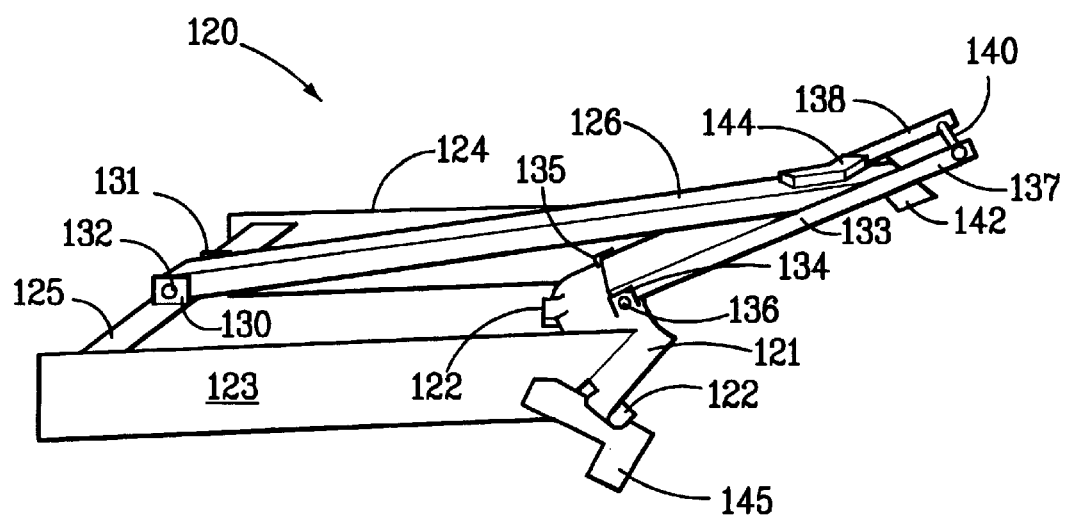
FIG. 7 is a side perspective view of an alternate embodiment of a drum draining device according to the present invention.

Referring now to FIG. 7, an alternate embodiment of a drum draining apparatus 120 according to the present invention is shown. The drum draining apparatus 120 is shown in a nearly folded condition in FIG. 7 having a collar portion 121 with inturned flange members 122 disposed thereon. Second vessel support means is also provided shown comprising a pair of side walls 123, 124 which are each connected to the collar member 121 at one end thereof and extend outwardly therefrom. A connecting member 125 connects the side walls 123, 124. The connecting member 125 supports the arm 126 which is pivotally maintained on the connecting member 125 by a pair of flange members 130, 131 and a fastening member, such as for example the bolt 132 extending through the flange members 130, 131, to retain the arm 126. The arm 126 extends through a central support member 133 which is pivotally connected to the collar 121. Preferably, connecting means are employed and may comprise a pair of flanges 134, 135 and a bolt 136 to secure the support member 133 to the collar portion 121. The support member further includes a pair of legs 137, 138 at the end opposite that connected to the collar portion 121.

The legs 137, 138 are shown with a retaining pin 140 extending transversely between them and connecting them. The arm 126 further includes engaging means for engaging the side of a first vessel 220 when the apparatus is in use (see FIGS. 8 and 9). Engaging means is shown preferably comprising a foot 142 which is disposed at the end of the arm member 126. The arm member 126 also includes latching means, such as, for example, the clamping member 144. The clamping member 144 is provided to engage the retaining pin 140 when the apparatus 120 is installed on a first vessel 220, and is fully unfolded for use. Stop means are also included to regulate the position of the second vessel when the apparatus 120 is in use. The stop means is shown comprising bracket members 145, 146 (FIG. 9).

Figure 8:
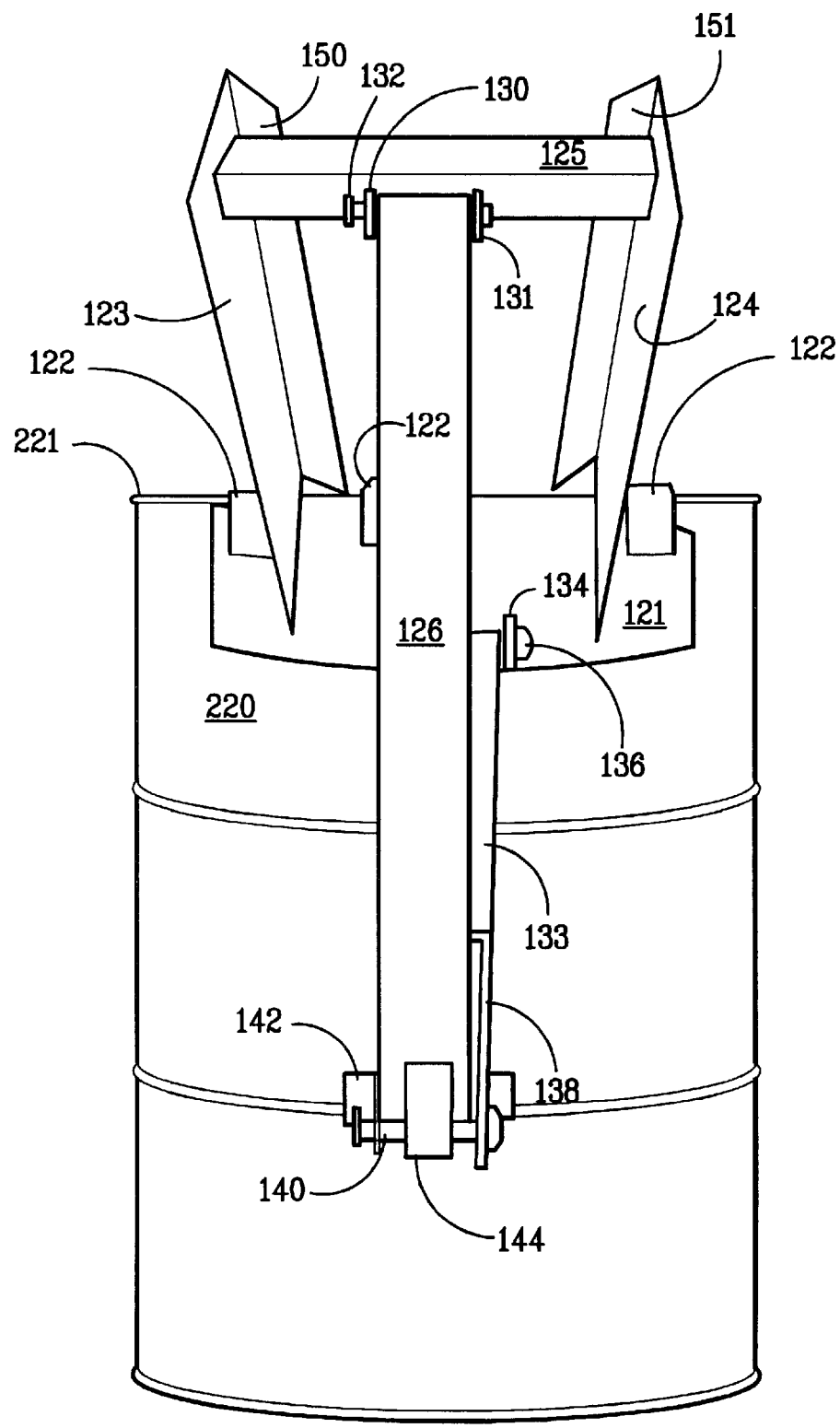
FIG. 8 is a rear perspective view of the device of FIG. 7 shown installed on a first vessel.

Referring to FIG. 8, the drum draining device 120 is shown installed on a first vessel 220 having a rim 221 over which the inturned flange members 122 are positioned. Preferably, cradling means comprising angled wall portions 150, 151 are provided on the side walls 123, 124 of the second support means. The angular wall portions 150, 151 support a second vessel such as, for example, the second vessel shown and described above in connection with the embodiment of FIGS. 1 through 6.

Figure 9:
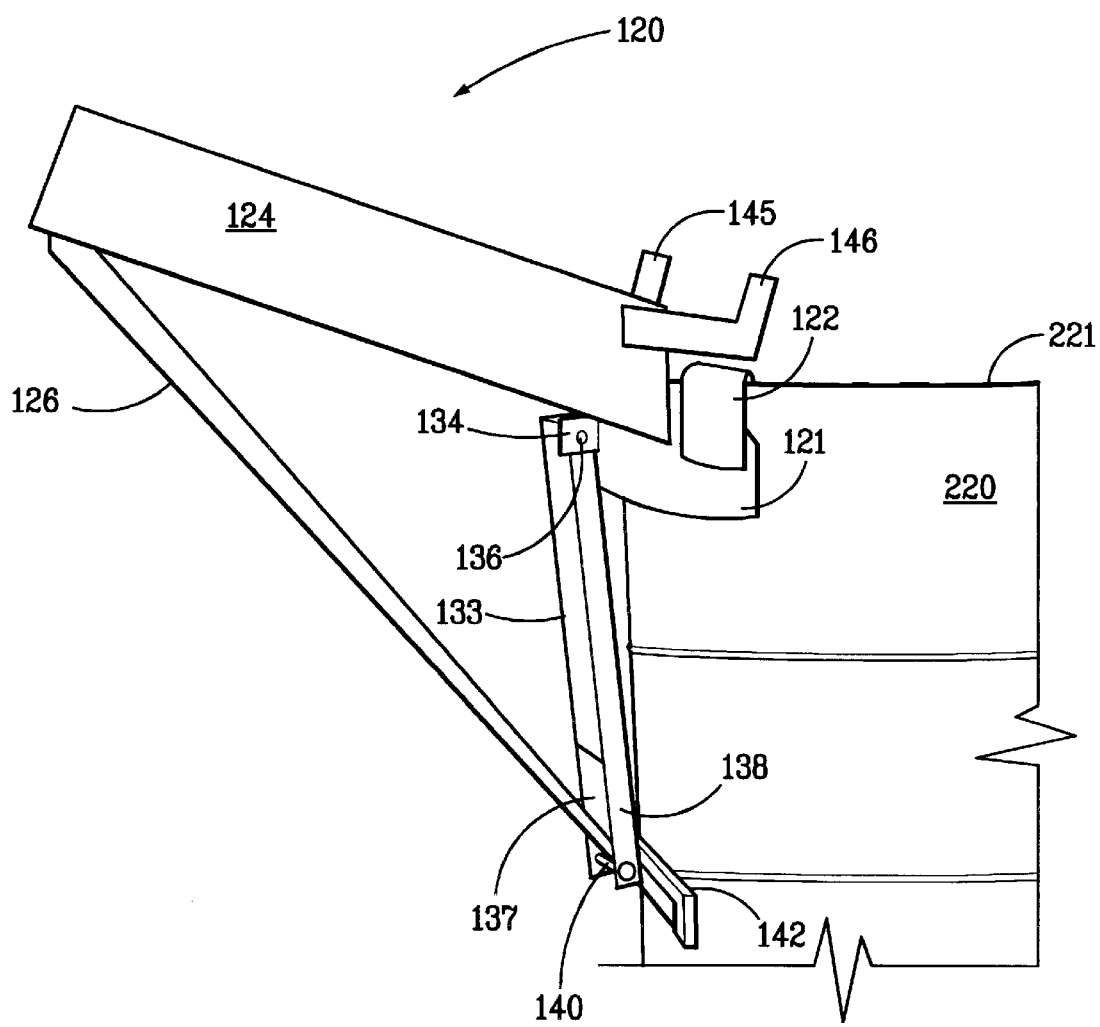
FIG. 9 is a left side perspective view of the apparatus of FIGS. 7 and 8, in use with a first vessel, shown in a partial view.

Referring to FIG. 9, a side view showing the apparatus 120 in position on a first vessel 220 is shown. In the view of FIG. 9, the stop means, shown comprising the bracket members 145, 146 is best seen. A second vessel (not pictured) containing contents to be emptied into the first vessel 220 will be understood to be positioned on the second vessel support means, comprising the wall portions 123, 124 and the respective angled walls 150, 151. When a second vessel is placed on the second support means, the rim 221 can rest against the stop members 145, 146 and the contents of the second vessel can be therefore drained into the first vessel 220.

In addition, while the apparatus is shown with a single-sized vessel in use therewith, it will be understood that other sized containers can be used with the present invention by providing appropriately sized components for the size of the container to be drained.

These and other advantages of the present invention can be made consistent with the spirit and scope of the invention as disclosed in the Summary of the Invention, the Brief Description of the Drawing Figures, the Detailed Description of the Preferred Embodiments, and the appended Claims. While the above description constitutes the preferred embodiment of the present invention, it will be appreciated that the invention is subject to modification, variation and change, without departing from the proper scope or fair meaning of the present invention. In this regard, while the various features of the present invention have been shown and described in relation to a drum, it will be understood that many of these features are suitable in connection with other types of vessels.

What is claimed is:

1. A compact, foldable, storable, portable drum draining apparatus for facilitating the draining of material from a second vessel into a first vessel, comprising:
    a) at least one supporting base member for resting on a surface;
    b) a first supporting member for supporting the first vessel, said first supporting member being connected to said base member;
    c) first securing means for securing the first vessel to said first supporting member, said first securing means including an engagement portion being connected to said first supporting member, said engagement portion being in detachable engagement with the first vessel wherein the first vessel is maintained in a generally fixed position relative to said first supporting member during use of said apparatus;
    d) a second supporting member for supporting the second vessel, said second supporting member being connected to said first supporting member and including means supporting the second vessel;
    e) second securing means for securing the second vessel to said second supporting member wherein the second vessel is maintained in a generally fixed position relative to said second supporting member during use of said apparatus; and
    f) lifting means for lifting the second vessel supported with said second supporting member from a first position in which gravity maintains the contents in the second vessel to a second position which permits gravitational emptying of the contents of the second vessel.

2. The drum draining apparatus of claim 1, wherein said lifting means comprises a lifting handle and hydraulic means for facilitating lifting of the second vessel secured to said second supporting member.

3. The drum draining apparatus of claim 1, further comprising connecting means connecting said second supporting member to said first supporting member, said connecting means comprising pivot means for providing relative pivotal movement of said second supporting member with respect to said first supporting member, and wherein said connecting means comprises stop means for fixing the position of said second supporting member relative to said first supporting member for maintaining the second vessel at an incline relative to the first vessel which permits gravitational emptying of the contents of the second vessel into the first vessel.

4. The drum draining apparatus of claim 1, wherein said second securing means comprises at least one flange member disposed on said second supporting member for retaining the second vessel, said at least one flange member providing a stop against which the second vessel engages when positioned above the first vessel at an incline thereto for draining the contents therefrom.

5. The drum draining apparatus of claim 4, wherein said second securing means further comprises a removably provided surrounding member which surrounds the second vessel, and fastening means for securing and releasing said surrounding member to and from engagement with the second vessel.

6. The drum draining apparatus of claim 1, wherein said lifting means comprises a lifting handle extending from said second supporting member, said lifting handle including a gripping portion and a base portion, wherein the second vessel is loaded by positioning the second vessel on said base portion of said handle.

7. The drum draining apparatus of claim 1, wherein said lifting means includes a lifting member pivotally connected to said second supporting member to pivot over a predetermined range from a first position substantially parallel to said second supporting member to a second position substantially perpendicular to said second supporting member.

8. The drum draining apparatus of claim 1, wherein said first supporting member comprises a support member which is adjustably provided to permit attachment of said first supporting member to first vessels having different heights.

9. The drum draining apparatus of claim 1, wherein said first supporting member comprises a support member which is adjustably provided to permit attachment of said first supporting member to first vessels having different heights, and wherein said second supporting member comprises a support member which is adjustably provided to permit attachment of said second supporting member to second vessels having different heights.

10. A compact, foldable, storable, portable drum draining apparatus for facilitating the draining of material from a second vessel into a first vessel, comprising:
   a) base means;
   b) first support means for supporting the first vessel, said first support means comprising a support member which is adjustably provided to permit attachment of said first support means to first vessels having different heights;
   c) second support means for supporting the second vessel;
   d) first securing means for securing said first support means to the first vessel;
   e) second securing means for securing said second support means to the second vessel;
   f) connecting means connecting said first support means with said second support means, said connecting means comprising means for collapsing said second support means relative to said first support means to facilitate folding of said apparatus; and
   g) lifting means for facilitating lifting of said second support means and the second vessel carried thereby
   wherein said lifting means is provided to lift the second vessel from a first position in which gravity maintains the contents in the second vessel to a second position which permits gravitational emptying of the contents of the second vessel.

11. The drum draining apparatus of claim 10, wherein said lifting means further comprises hydraulic means for facilitating lifting of said second support means.

12. The drum draining apparatus of claim 11, wherein said lifting means includes a lifting member pivotally connected to said second support means to pivot over a predetermined range from a first position substantially parallel to said second support means to a second position substantially perpendicular to said second support means.

13. The drum draining apparatus of claim 10, wherein said lifting means includes a lifting member pivotally connected to said second support means to pivot over a predetermined range from a first position substantially parallel to said second support means to a second position substantially perpendicular to said second support means.

14. The drum draining apparatus of claim 10, wherein said connecting means comprises hinging means pivotally connecting said first support means with said second support means, and locking means for locking the position of said first support means relative to said second support means to maintain said first support means at an inclined position relative thereto.

15. The drum draining apparatus of claim 10, wherein said second support means comprises a support member which is adjustably provided to permit attachment of said second support means to second vessels having different heights.

16. The drum draining apparatus of claim 10, wherein said second securing means comprises at least one flange member disposed on said second support means for retaining the second vessel, said at least one flange member provides a stop against which the second vessel engages when positioned above the first vessel at an incline thereto for draining the contents therefrom.

17. The drum draining apparatus of claim 10, wherein said first support means is pivotally connected to said base member.

18. A compact, foldable, storable, portable drum draining apparatus for facilitating the draining of material from a second vessel into a first vessel, comprising:
   a) at least one supporting base member;
   b) a first supporting member for supporting the first vessel, said first supporting member being connected to said base member;
   c) a second supporting member for supporting the second vessel, said second supporting member being connected to said first supporting member;
   d) first securing means for attaching said first supporting member to the first vessel, said first securing means comprising (i) a plurality of generally unshaped flange members which engage the rim of the first vessel and (ii) a removably provided surrounding member which surrounds the first vessel, and fastening means for securing and releasing said surrounding member to and from engagement with the first vessel;
   e) connecting means for pivotally connecting said first supporting member with said second supporting member to permit relative movement of the second vessel relative to the first vessel, said connecting means further comprising means for collapsing said second supporting member relative to said first supporting member for folding of said apparatus;
   f) a lifting member connected to said second supporting member and extending outwardly therefrom, said lifting member being pivotally connected to said second supporting member and selectively securable in an operating position and a collapsed position, said lifting member including a handle for facilitating grasping thereof for facilitating lifting of said second support means and the second vessel carried thereby; wherein said lifting means is provided to lift the second vessel from a first position in which gravity maintains the contents in the second vessel to a second position which permits gravitational emptying of the contents of the second vessel; and
   g) hydraulic means comprising a hydraulic member for facilitating the lifting of the second vessel from a position adjacent the first vessel, said hydraulic member being connected at one end thereof to said first supporting member and at the other end thereof to said second supporting member, wherein said hydraulic member provides a force pivoting said second supporting member relative to said first supporting member.

19. The drum draining apparatus of claim 18, wherein said second supporting member comprises a pair of supporting members disposed parallel to each other and comprising a seat on which the second vessel is positioned.

20. The drum draining apparatus of claim 18, wherein said first supporting member is pivotally connected to said base member.

21. The drum draining apparatus of claim 18, wherein said first supporting member comprises a support member which is adjustably provided to permit attachment of said first supporting member to first vessels having different heights.

22. The drum draining apparatus of claim 18, wherein said first supporting member comprises a support member which is adjustably provided to permit attachment of said first supporting member to first vessels having different heights, and wherein said second supporting member comprises a support member which is adjustably provided to permit attachment of said second supporting member to second vessels having different heights.

23. A compact, foldable, storable, portable drum draining apparatus for facilitating the draining of material from a second vessel into a first vessel, comprising:

a) a first supporting member having a collar portion and a central support member extending downwardly therefrom, said central support member being pivotally connected to said collar member at one end thereof and having a slot therein at the other end thereof;

b) securing means for securing said first supporting member to the first vessel;

c) a second supporting member connected to said collar portion and having means for supporting the second vessel thereon;

d) an arm which is pivotally connected to said second supporting member at one end thereof, with the other end of said arm extending through said slot of said central support member and having an engaging portion thereon for engaging the first vessel; and e) latching means for latching said arm in relation with said central support member.

24. The drum draining apparatus of claim 23, wherein said second support means includes stop means for regulating the position of the second vessel.

25. The drum draining apparatus of claim 18, wherein said securing means comprises turned Range members disposed on said collar portion.

26. The drum draining apparatus of claim 23, wherein said latching means further comprises a fastening member carried on the end of said locking member carrying said engaging portion for securing said arm to said central supporting member.

27. The drum draining apparatus of claim 23, wherein said second supporting member further comprises at least one flange member disposed on said second supporting member for retaining the second vessel, said at least one flange member providing a stop against which the second vessel engages when positioned above the first vessel at an incline thereto for draining the contents therefrom.

28. The drum draining apparatus of claim 27, further comprising a removably provided surrounding member which surrounds the second vessel, and fastening means for securing and releasing said surrounding member to and from engagement with the second vessel.

29. The drum draining apparatus of claim 23, wherein said first supporting member is pivotally connected to said base member.

30. The drum draining apparatus of claim 23, wherein said second supporting member comprises a pair of supporting members disposed parallel to each other and comprising a seat on which the second vessel is positioned.

31. The drum draining apparatus of claim 23, wherein said first supporting member comprises a support member which is adjustably provided to permit attachment of said first supporting member to first vessels having different heights.

32. The drum draining apparatus of claim 23, wherein said first supporting member comprises a support member which is adjustably provided to permit attachment of said first supporting member to first vessels having different heights, and wherein said second supporting member comprises a support member which is adjustably provided to permit attachment of said second supporting member to second vessels having different heights.

* * * * *

UNITED STATES PATENT AND TRADEMARK OFFICE
CERTIFICATE OF CORRECTION

PATENT NO. : 6,213,352 B1
DATED : April 10, 2001
INVENTOR(S) : Homer W. Boyer, Jr.

It is certified that error appears in the above-identified patent and that said Letters Patent is hereby corrected as shown below:

Column 7,
Line 21, delete "unshaped" and replace with -- u-shaped --.

Column 12, claim 18,
Line 13, delete "unshaped" and replace with -- u-shaped --.

Column 13, claim 25,
Line 22, delete "18" and replace with -- 23 --, and
Line 23, delete "Range" and replace with -- flange --.

Signed and Sealed this

Twentieth Day of November, 2001

Attest:

*Nicholas P. Godici*

Attesting Officer

NICHOLAS P. GODICI
*Acting Director of the United States Patent and Trademark Office*